No. 809,590. PATENTED JAN. 9, 1906.
J. P. WATSON & F. L. JAHN.
PUMP REGULATOR.
APPLICATION FILED JULY 14, 1905.

Witnesses.
Gerald de Grey
A. W. Renninger

Inventors.
James P. Watson.
Frederick L. Jahn.
By R. C. Wright
atty.

UNITED STATES PATENT OFFICE.

JAMES P. WATSON AND FREDERICK L. JAHN, OF PHILADELPHIA, PENNSYLVANIA, ASSIGNORS TO THE WATSON & McDANIEL COMPANY, A CORPORATION OF PENNSYLVANIA.

PUMP-REGULATOR.

No. 809,590.   Specification of Letters Patent.   Patented Jan. 9, 1906.

Application filed July 14, 1905. Serial No. 269,597.

*To all whom it may concern:*

Be it known that we, JAMES P. WATSON and FREDERICK L. JAHN, citizens of the United States, residing at Philadelphia, in the county of Philadelphia and State of Pennsylvania, have invented certain new and useful Improvements in Pump-Regulators, of which the following is a specification.

This invention relates to pressure-regulators, and more especially for pumps, and by means of which the hydraulic pressure in the pump actuates a piston connected to the steam-admission valves to open them when a decrease of pump-pressure occurs and to close them when an excess of pressure occurs, and thus operate the pump at a uniform pressure.

The general features herein presented are similar to those in our application, Serial No. 251,784, filed March 24, 1905; but in order to insure more sensitiveness and consequent delicacy of operation for a minimum variation of the pressure in the pump, improvements have been made whereby the friction of the parts between the hydraulic piston and the spring have been overcome, so that now the pressure in the pump has a minimum variation. The principal improvements are in the piston, which is now chambered to near its top or point of hydraulic pressure and is there supported by a pin or equivalent means which overcomes and avoids the side frictions incident to a piston supported from its lower end or at a distance somewhat removed from the point of pressure. The sliding friction of the spring-lever on the hydraulic piston, which had a tendency to bind the piston by side pressure on the packing and the guide in the cylinder, has been overcome by the end bearing-support now introduced, which frees the piston and spring-lever from contact. The spring-seat and spring-lever have been improved, so that now the movement of the lever, however great, has no tendency to cant the spring and its seat, due to the radial movement of the lever and the points of contact, all of these features of construction being combined with the essential elements of the previous application.

The invention is illustrated in the accompanying drawings, in which similar figures of reference designate similar parts, in which—

Figures 1, 3:
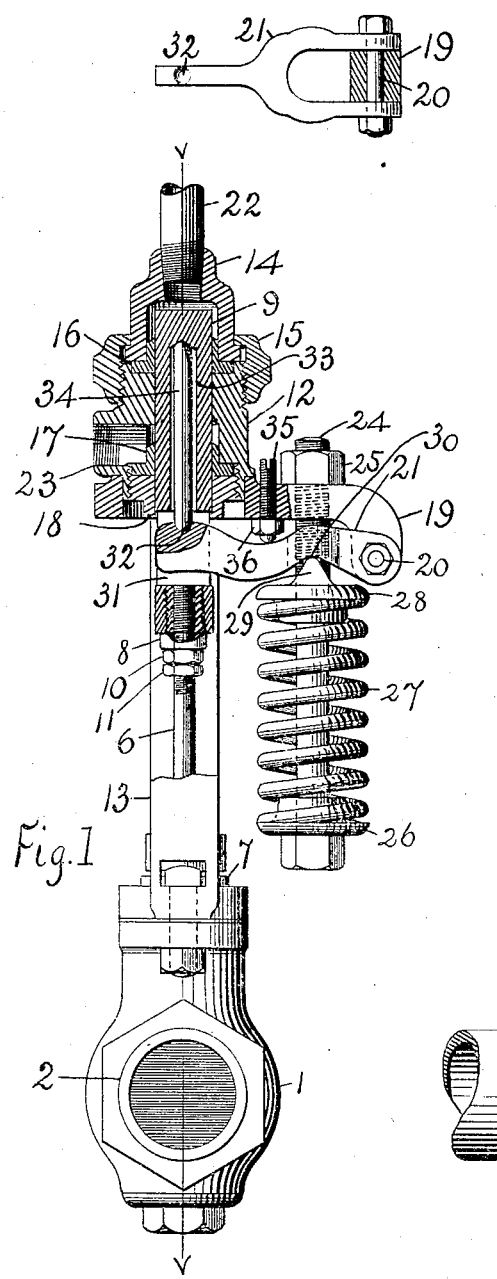
Figure 2:
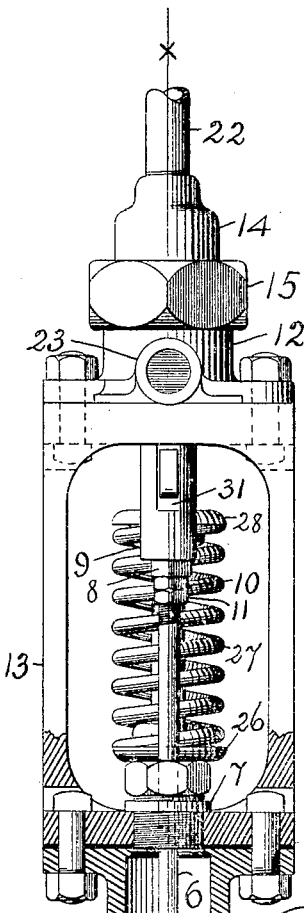

Figure 1 is an elevation view with some parts in section on line $x\ x$, Fig. 2. Fig. 2 is an elevation view at an angle of ninety degrees from Fig. 1 with some of the parts in section on line $v\ v$, Fig. 1. Fig. 3 is a plan of the lever connecting the spring and hydraulic piston.

As in the previous invention there is a valve-case 1, with an inlet-pipe 2 and an outlet-pipe 3, and balanced steam-valves 4 5, the steam-valves having a stem 6, passing through a stuffing-box 7 and adjustably united to a bushing 8, screwed into the lower end of the hydraulic piston 9 and secured by nut 10 and check-nut 11. Piston 9 is inserted in a cylinder 12, mounted on a frame 13, which is secured to case 1. Cylinder 12 has a cap 14, secured by a nut 15, and a packing 16 is interposed between the cap and piston, and there is also a packing 17 at the lower end of the cylinder, secured by a nut 18, screwed to the cylinder. The manner of packing, however, is immaterial, provided it prevents leakage. A lug 19 projects from one side of the top of frame 13, as heretofore, and has a bolt 20, forming a fulcrum for spring-lever 21. A pipe 22 leads from the pump (not shown) to cap 14, and a boss 23 is tapped to receive a drain-pipe. A spring-supporting bolt 24 is screwed through lug 19 and is locked by a nut 25, and at the lower end of the bolt is a spring-seat 26 for the spring 27, and there is a seat 28 above the spring which has rounded projections 29 freely seated in curved depressions 30 in lever 21, the point of contact of projections 29 with the depressions 30 being on a horizontal line with the center of fulcrum 20 to avoid any side pressure on seat 28, due to the radial movement of the lever 21 and its depressions 30. The inner end of lever 21 passes into a slot 31 in piston 9, and the top of the lever has a seat 32. Piston 9 has a chamber 33 extending to near its upper end in order to support it as near its top and point of pressure as possible to avoid the side pressure and friction due to a support bearing upon its lower end, and within chamber 33 there is an end bearing-support 34, having its upper end seated at the end of the chamber and its lower end seated to bear on lever 21 in seat 32. The employment of an end-supporting means between the lever and the piston and supporting the piston at its point of pressure has been found so nearly free of movement and friction that the spring can be so delicately adjusted as to insure a minimum variation of pump-pressure. As heretofore, the speed limit consists of the screw 35 passing through lug 19 with a check-nut 36 can be set to prevent spring 27 from opening the steam-valves 4 5 to run the pump at a dangerous or breakable speed whenever there is a sudden decrease of hydraulic pressure in the pump.

We claim—

1. In a pump-regulator, a case, a steam-inlet and an outlet therefor, balanced steam-valves in the case, a stem for the valves, a framework supported on the case, a hydraulic cylinder supported on the framework and in alinement with the case, a chambered piston in the cylinder and adjustably connected to the valve-stem; a passage from the pump to the hydraulic cylinder; a spring supported out of alinement with the valves and piston, with means to adjust its tension; a lever fulcrumed upon the framework, a seat for the spring having means for engagement with the lever, and a support from the end of the lever opposite its fulcrum, which enters and is seated in the piston's chamber at a point near the head of the piston and where it receives its pressure.

2. In a pump-regulator, the combination of balanced steam-valves, and a stem therefor, a hydraulic piston adjustably connected to the stem and in alinement therewith, a lever fulcrumed at its outer end and extending to the hydraulic piston, a spring adjustably suspended between the lever's fulcrum and the hydraulic piston and whereby the spring is placed out of alinement with the valves and piston and its movement is less than the movement of the valves and piston, depressions in the lever, a spring-seat having projections engaging the depressions, and a supporting means for the piston which engages the lever and extends to the point of pressure on the piston.

3. In a pump-regulator, a case with steam connections thereto and therefrom, a framework for the case and a hydraulic cylinder thereon in alinement with the case, a piston in the cylinder and adjustably secured to the valve-stem in direct alinement, a passage from a pump to the hydraulic cylinder, a lever pivotally supported at its outer end, a spring adjustably supported upon the framework and bearing upon the lever between its pivot and the piston to decrease its movement relative to the piston and valves, a speed limit adapted for adjustment to contact and restrict the lever's movement and the opening of the steam-valves, and a means of support from the lever to the piston which at one end engages the lever and at its opposite end engages the piston at its end which is subjected to hydraulic pressure.

4. In a pump-regulator, steam-valves and a hydraulic piston adjustably connected, a spring adapted to resist the pressure on the piston and seated upon a lever whereon is also seated an end bearing-support adapted to support the piston at its point subjected to pressure.

5. In a pump-regulator, steam-valves and a hydraulic piston adjustably connected, a spring supported in manner for its less movement than the movement of the valves and piston, and seated upon a lever having a pin-support for the piston and whereby the piston is supported at its point subjected to pressure.

In testimony whereof we affix our signatures in presence of two witnesses.

JAMES P. WATSON.
FREDERICK L. JAHN.

Witnesses:
WILLIAM C. STOEVER,
RANSOM C. WRIGHT.